United States Patent [19]

DeMoss et al.

[11] 4,327,386
[45] Apr. 27, 1982

[54] PNEUMATIC COMMUTATOR FOR END-WISE PARTITIONING

[75] Inventors: Dean DeMoss, Camarillo; Norman S. Blessum, Thousand Oaks; Ko Ko Gyi, Thousand Oaks; Herbert U. Ragle, Thousand Oaks, all of Calif.

[73] Assignee: Burroughs Corporation, Detroit, Mich.

[21] Appl. No.: 71,577

[22] Filed: Aug. 31, 1979

[51] Int. Cl.³ .................. G11B 5/016; G11B 23/02; G11B 25/04
[52] U.S. Cl. ............................. 360/99; 360/133
[58] Field of Search ....................... 360/97–99, 360/133–135

[56] References Cited

U.S. PATENT DOCUMENTS

| | | | |
|---|---|---|---|
| 4,011,591 | 3/1977 | Orlando et al. | 360/98 |
| 4,019,204 | 4/1977 | Griffiths et al. | 360/99 |
| 4,086,640 | 4/1978 | Ragle et al. | 360/133 |
| 4,167,029 | 9/1979 | Ragle et al. | 360/98 |

Primary Examiner—Alfred H. Eddleman
Attorney, Agent, or Firm—John J. McCormack; Nathan Cass; Kevin R. Peterson

[57] ABSTRACT

Improved disk drive equipment is illustrated, being characterized by improved partitioning means for partitioning a pack of flexible magnetic recording disks, the partitioning means featuring "pneumatic commutator" means for distributing air streams to various inter-disk gaps in the pack—this commutator means constituting part of an external, rotationally stabilized jet-select apparatus.

8 Claims, 21 Drawing Figures

Fig. 13-A

PNEUMATIC COMMUTATOR FOR END-WISE PARTITIONING

CROSS REFERENCE TO RELATED APPLICATIONS

The following commonly assigned, recently filed patent applications are related to the subject matter of this application and are herewith incorporated by reference.

Ser. No. 711,579, filed Aug. 4, 1976 Now U.S. Pat. No. 4,134,144
Ser. No. 711,628, filed Aug. 4, 1976 Now U.S. Pat. No. 4,134,143
Ser. No. 711,647, filed Aug. 4, 1976 Now U.S. Pat. No. 4,086,640
Ser. No. 720,905, filed Sept. 7, 1976 Now U.S. Pat. No. 4,136,368
Ser. No. 720,910, filed Sept. 7, 1976 Now Abandoned
Ser. No. 766,288, filed Feb. 7, 1977 Now U.S. Pat. No. 4,086,641
Ser. No. 864,011, filed Dec. 23, 1977 Now Abandoned in favor of Ser. No. 960,267, now abandoned in favor of Ser. No. 155,366
Ser. No. 890,799, filed Mar. 27, 1978, Now U.S. Pat. No. 4,167,029; and
Ser. No. 049,553, filed June 18, 1979 as a continuation of Ser. No. 890,799, now U.S. Pat. No. 4,167,029

BACKGROUND AND FEATURES OF THE INVENTION

This invention relates to data recording files and in particular to novel improved multi-disk arrangements of data records and associated means for automatically partitioning them pneumatically.

Workers in the art of generating and using flexible recording disks are aware of its various advantages and shortcomings. As mentioned in the cited U.S. Ser. No. 711,647 now U.S. Pat. No. 4,086,640 and U.S. Ser. No. 870,799 now U.S. Pat. No. 4,167,029, magnetic disks have well known advantages, and in the form of "flexible disks" can serve as a "unit record" medium that is compact, light, and is readily transported, stored, and handled, interchangeably with other like disks. Flexible (or "floppy") disks are now widely used in the data processing arts.

This invention is directed toward improved automatic partitioning of such "floppy packs" with automatic pneumatic partition means employed to split the pack and expose any selected disk surface. That is, an improved pneumatic partitioner for a "floppy disk pack" according to the invention is particularly adapted for such automatic partitioning.

Prior Efforts with Flexible Disks

Workers are familiar with prior approaches to the design and manufacture of floppy disks and to related equipment for handling them. Several are described in U.S. Ser. No. 711,647 now U.S. Pat. No. 4,086,640, in U.S. Ser. No. 890,799 now U.S. Pat. No. 4,167,029 and elsewhere.

This invention is intended to better manipulate multi disk floppy packs (disk packs) with "end-wise" partitioning—doing so simply, quickly and at minimum-cost. The invention maintains the convenience of packaging a number of floppy disks in an "end-wise" partitionable file, while prescribing improved simplified techniques for partitioning with a very few mechanical select elements, disposed "externally", i.e., outside the pack.

Pack partitioning has been proposed heretofore according to some, rather probablematical, techniques—some involving mechanical elements injected into the confines of the disk pack—something which is best avoided for many reasons (e.g., to maintain simplicity of pack construction and interchangeability between packs, to avoid damaging disk surfaces, etc.). Other related techniques are described in some of the cited applications.

Another prior technique (also mentioned in some of the cited applications) involves a distributor piston disposed within the pack-hub and adapted to afford "jet-select" by positioning a port opposite a selected inter-disk spacer, thereby directing a partition jet of air between selected disks. The subject invention provides simple external jet distributor means—avoiding the problems associated with injecting mechanical means into the confines of the disk pack—yet still providing "end-wise" pneumatic partitioning of the pack.

External jet select/distributor means is advantageous in several respects as discussed in U.S. Pat. No. 4,167,029. When simplified, using "U-ridged" piston commutator means as described herein, it becomes even more desirable.

The present invention is directed toward providing improved external pneumatic partitioning means for flexible disk files—including hub-commutator means which are better adapted to meet the foregoing problems and objectives.

The foregoing and other features, objects and advantages according to the present invention will be more fully appreciated and become more apparent upon consideration of the following description of preferred embodiments, taken in conjunction with the attached drawings, wherein like reference indicia denote like elements.

BRIEF DESCRIPTION OF THE DRAWINGS

FIG. 1 is a rather schematic elevation showing a simplified instructive flexible disk pack arrangement which is "end-wise partitioned", pneumatically, and externally, from adjacent its hub region, with pack rotation means and a transducer assembly also indicated in schematic cooperative relation; while

FIG. 5 is a side elevation, in partial section, of a disk pack similar to that in FIG. 1, shown mounted in operative relation with a first type of external jet partitioning selector/distributor combination; while

BACKGROUND OF THE INVENTION (FIGS. 1–11)

Workers in the art are quite familiar with the design and construction of conventional floppy disks and disk packs as well as associated disk drive and related means to manipulate such disk packs including means for partitioning them. Our cited copending U.S. patent applications give details of such disk packs and related equipment. The cited applications indicate various implementations for the "end-wise partitioning" of a flexible disk pack and disclose partition-apertured disks and associated "end-wise" partitioning means, such as mechanical ("through-disk") plungers or a hub-disposed piston for directing partition air streams.

Figure 10:
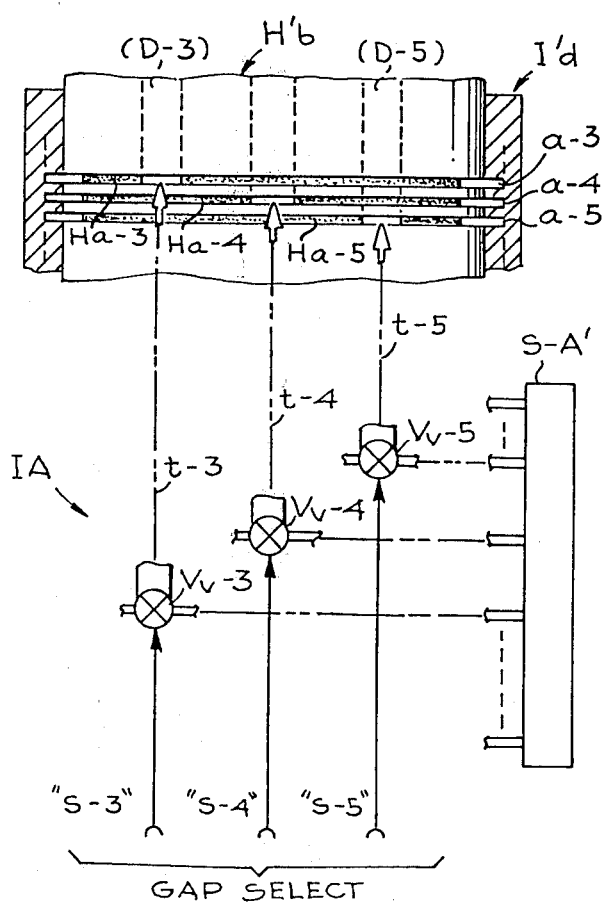
FIG. 10 shows a third type of external partitioning means with the selector/distributor arrangement modified over that indicated in FIGS. 5 and 9, being adapted to provide jet selection and distribution without any mechanical positioning translation or rotation of its principal parts.
Figure 8:
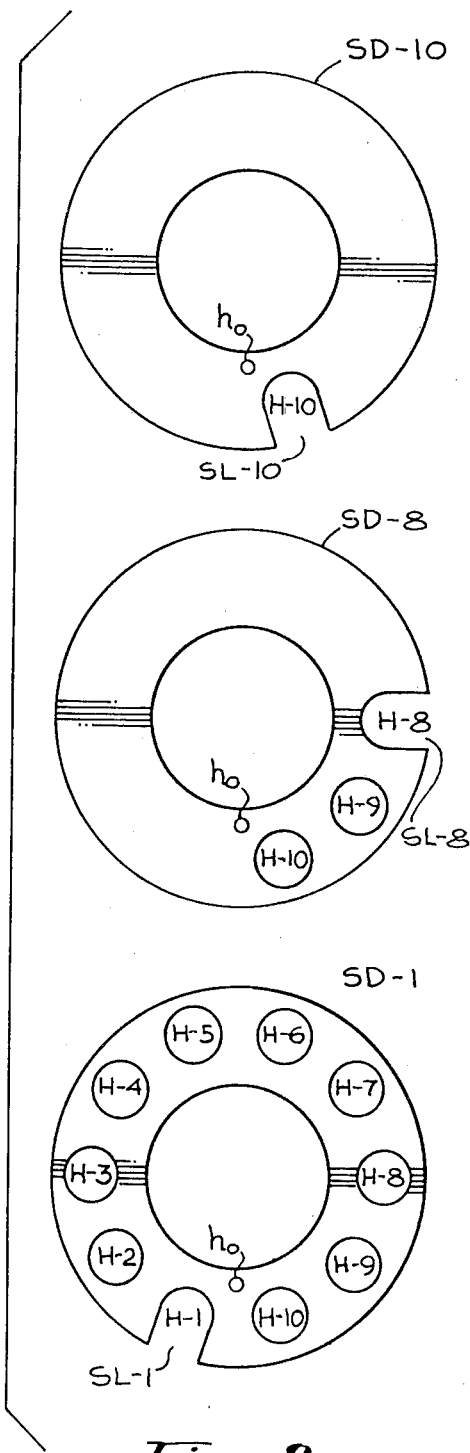
FIG. 8 shows, in plan view, a suitable array partition spacers adapted for use in the arrangement of FIGS. 5 to 7.
Figure 9:
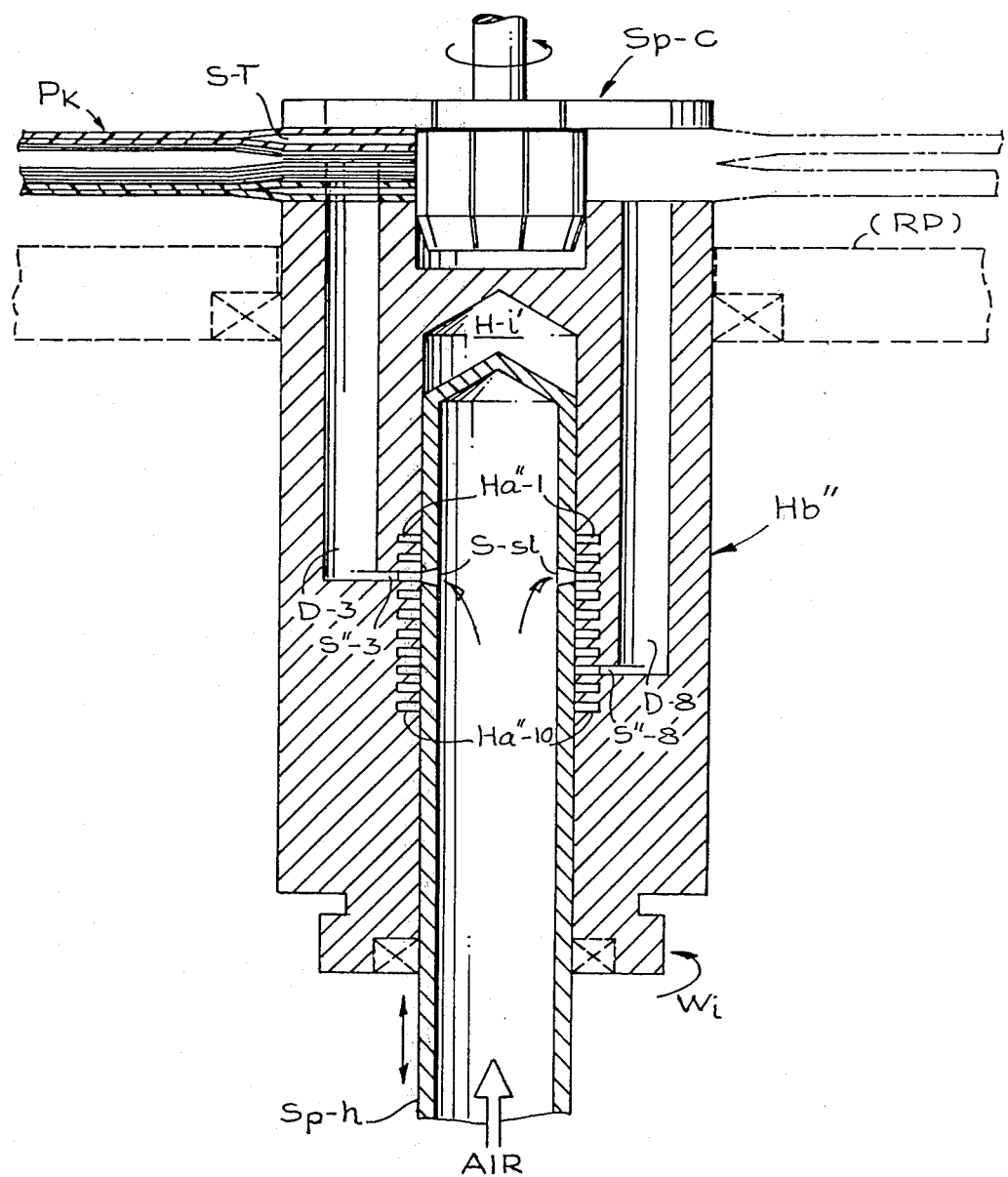
FIG. 9 shows a second alternate type of external partitioning means with the selector/distributor arrangement modified from that shown in FIG. 5.

FIGS. 1–4 indicate a simplified example of pneumatic partitioning, which is made "external" to the pack, and will serve to begin the introduction to embodiments of the invention (e.g., embodiments indicated in FIGS. 12–18 and described below). Thereafter, this introduction is expanded by reference to a jet selector/distributor combination (FIGS. 5–7 and 11) along with two modifications thereof (FIGS. 9 and 10, respectively).

Figure 1:
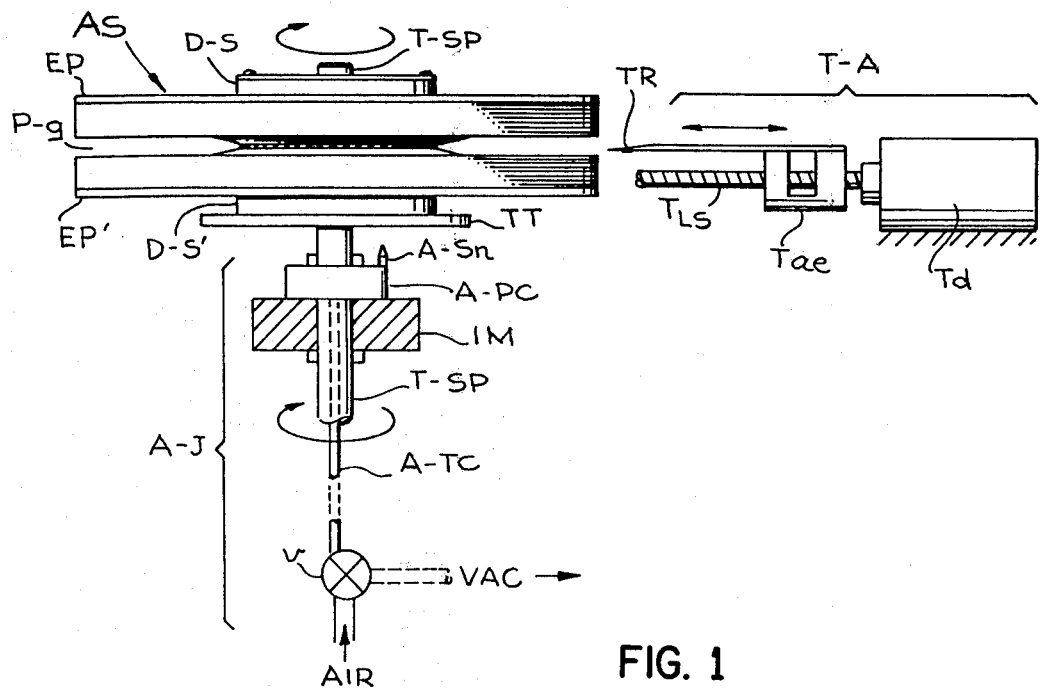

Pneumatic, Hub-Originated Partitioning; FIG. 1

FIG. 1 schematically suggests a disk pack and associated drive adapted for pneumatic "end-wise" partitioning (e.g., versus known mechanical methods). Preferably, partitioning is effected from within the stack's hub, or adjacent thereto, as detailed below.

Figure 2:
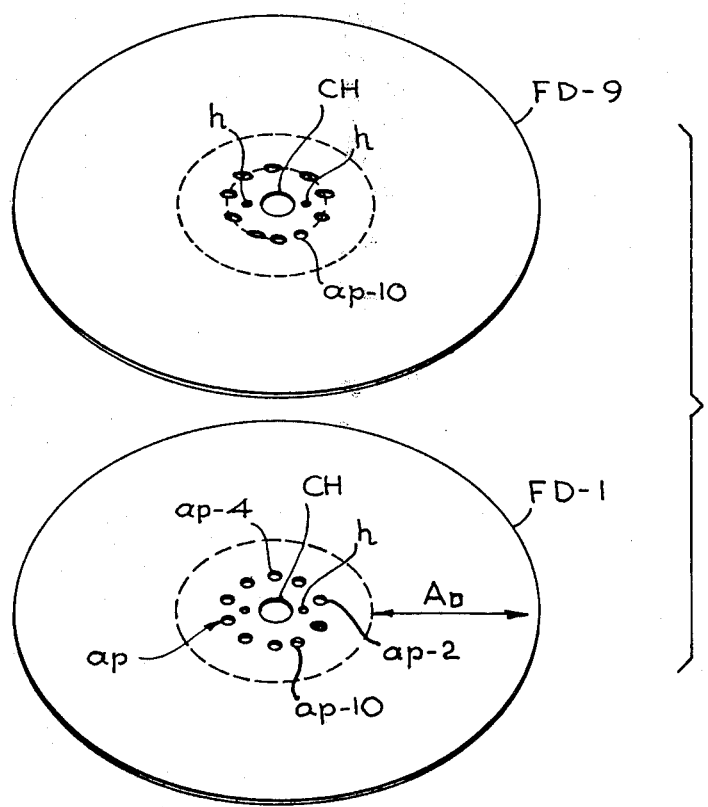
FIG. 2 shows a flexible disk design modified therefor.
Figure 4:
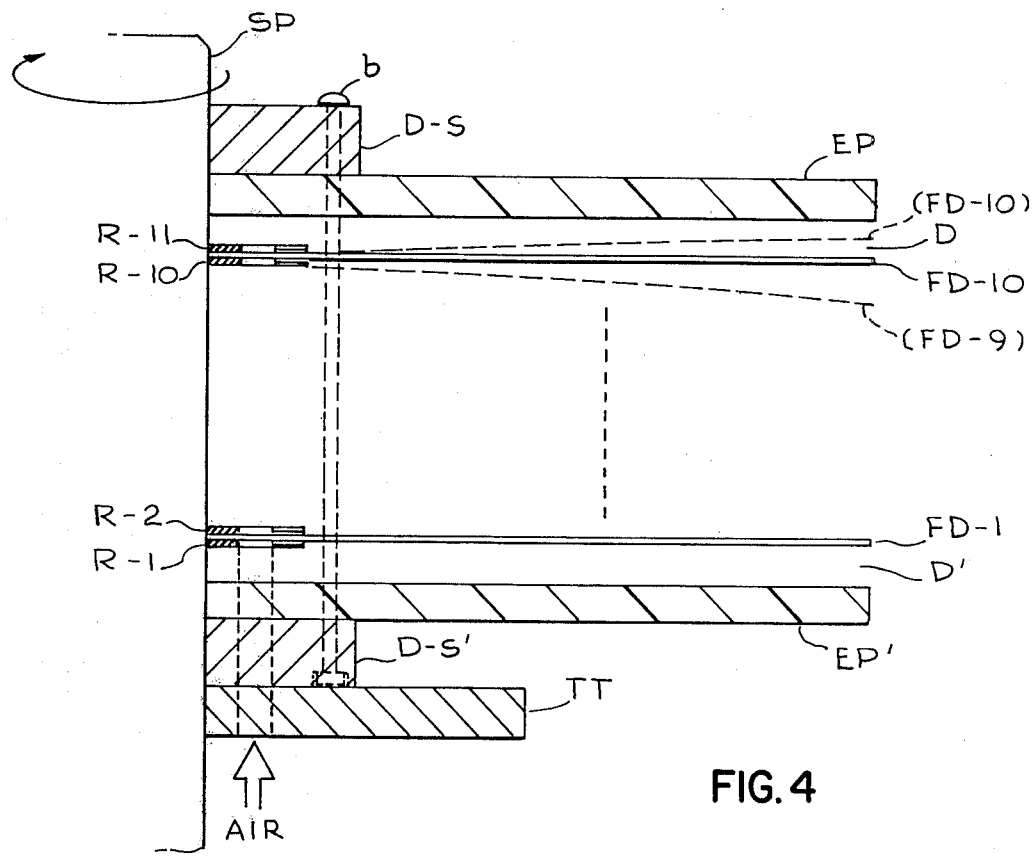
FIG. 4 is an enlarged partial side section of a disk pack as in FIG. 1, schematically indicating apertured spacers, clamps, end-plates and turntable, etc.
Figure 3:
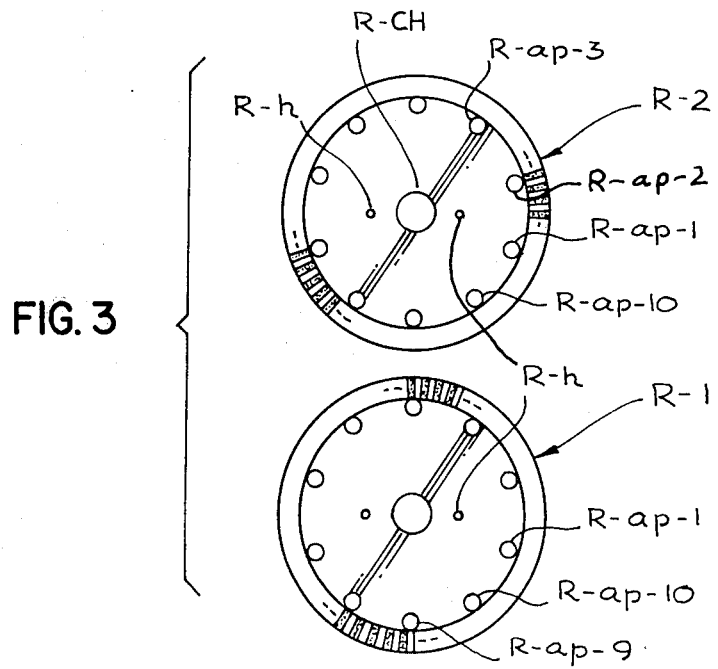
FIG. 3 shows an inter-disk spacer adapted for such partitioning.

Thus, FIG. 1 is a schematic, rather generalized functional showing of a flexible disk pack S mounted on a conventional turntable TT (for relatively high speed rotation) and comprising a stack of flexible disks FD with intermediate washers R, held together between a pair of collars D-S, D-S' (see also FIGS. 2, 3). Understood will be pneumatic partition means adapted to pneumatically partition the pack for access entry of a conventional transducer mount TR, adapted for high speed non-contact transduction as generally understood in the art. Here, and elsewhere, the materials, mechanisms and systems alluded to should be understood as conventionally constructed and operated as presently known in the art, except where otherwise mentioned.

Cited U.S. Pat. No. 4,167,029 explains details of the FIG. 1 arrangement and its operational features, including its floppy pack and related rotation means, partition air jet means, transducer assembly (including actuator means therefor). U.S. Pat. No. 4,167,029 particularly covers details of representative disks, spacers (e.g., see FIGS. 2–4 and 8) and related partition hole-patterns.

By way of summarizing features of such arrangements, in FIGS. 1–4, following is a description of salient operations, focusing on FIG. 1.

Partition Functions (FIG. 1)

A pressurized air supply (source not shown but well understood in the art) is adapted to be delivered through a conduit, a valve v and hollow center tube A-TC, as known in the art. In this way pressurized air (gas) is delivered to a prescribed sump chamber A-PC, including an associated delivery nozzle A-Sn, both understood as co-rotated with pack AS and sealed to a fixed central tube via air-tight couplings as known in the art. The nozzle A-Sn may be indexed selectively to different circumferential positions about the pack by rotary actuator (phase adjust means) IM, as known in the art. (Rotating chamber A-PC being thus in pneumatic communication with fixed hollow tube A-TC, mounted centrally within hollow spindle T-SP). Here, delivery of the air is effected up through hollow tube A-TC. In particular (and referring to the embodiments of FIGS. 1 and 2), it may be assumed that the partition between disks FD-1, FD-2 is effected by positioning the jet delivery nozzle rotationally with respect to pack AS so as to register with a selected bore (through TT, EP', dummy and record disks as well as intermediate spacers). This jet stream is directed upward through all the intervening spacers and disks to exit, radially, through the washer opposite the "selected" partition gap.

The operation of the elements indicated in FIGS. 1–4 will be apparent to those skilled in the art and in any event are also further described by way of example in the cited U.S. application (U.S. Ser. No. 864,011, see also Ser. No. 960,267) both now abandoned in favor of Ser. No. 155,366.

"Cylinder-Sleeve" Design (FIGS. 5–7 and 11):

FIGS. 5–7 and 11 illustrate another form of external pneumatic partitioning means consisting essentially of a cylinder $H_b$ (jet conduit distributor) and associated surrounding sleeve $I_d$ (jet-input selector) arranged to pneumatically partition the disks of a prescribed flexible disk pack Pk (like those aforedescribed except as otherwise noted). Pack Pk will be understood as constructed and operated as before indicated, and as detailed in U.S. Ser. No. 870,799, as are the other elements (e.g., see especially U.S. Ser. No. 870,799 re details of sleeve, cylinder and pack with spacers highlighted in FIG. 8).

By way of briefly summarizing features of this selector/distributor arrangement, there follows a description of its salient operations:

Operations; FIGS. 5–8 and 11

An exemplary operational sequence for the arrangement of FIGS. 5–8 and 11 will now be described. It will be assumed, for illustration purposes, that one desires to open a partitioning gap at $g_{7-8}$, (between disks FD-7 and FD-8 corresponding to the location of spacer SD-8); thus, the following operations are invoked:

Step 1: Position Sleeve $I_d$:

A "partition-select" (disk-select) signal "p-s" is applied to the subject Disk Drive, causing generation of a translate signal "T-S", adapted to cause associated linear actuation means (not shown, but well understood in the art) to translate "SELECT sleeve" $I_d$ so as to register exit-annulus $I_{da}$ thereof in relatively air-tight relation with groove Ha-8.

Step 2: Pulse-in Air:

Once this sleeve registration is achieved, a related "air-on" signal "s-v" is applied to open valve $V_A$ (e.g., signal "s-v" can be generated and enabled by appropriate logic indicating this registration along with related preconditions). Signal "s-v" causes valve $V_A$ to be "actuated OPEN" for a prescribed pulse period ($t_p$)—sending a prescribed, timed pulse for partitioning air from source S-A down inlet tube $I_t$. This jet pulse will issue through plenum chamber I-s to exit via groove $I_{da}$ into the "now-registered" facing groove Ha-8. This partition-jet enters duct D-8 via port S-8 and is conducted up D-8 to issue through the bore formed by registered spacer holes H-8 (registered with D-8). This jet pulse will exit therefrom, via exit slot SL-8 in spacer SD-8 (spanning selected gap g7-8) to open the associated partition gap (g7-8).

All the while (e.g, while tube $I_d$ is so moved and while this jet-pulse is sent to issue through gap g7-8), "isolationair" is being sucked-in to all ducts, etc. (grooves Ha, etc.) not blocked by the breather plugs $I_{dc}$, flanking Ha-8—thus grooves Ha-1 through Ha-7 sucked-in ambient air via slots G-1a, G-2a, G-3a; and grooves Ha-9, Ha-10 suck-in via slots G-1b, G-2b, G-3b.

Workers will see how this embodiment (FIGS. 5-8) provides the indicated results. Workers will also appreciate the bistable character of the partitioning so facilitated—whereby a gap is opened—and "held open'-'—by a partitioning jet pulse for a prescribed time (at least sufficient to open the desired partitioning gap the desired amount).

Alternate Selector/Distributor ("Post-in-Cylinder" array, FIG. 9)

Figure 5:
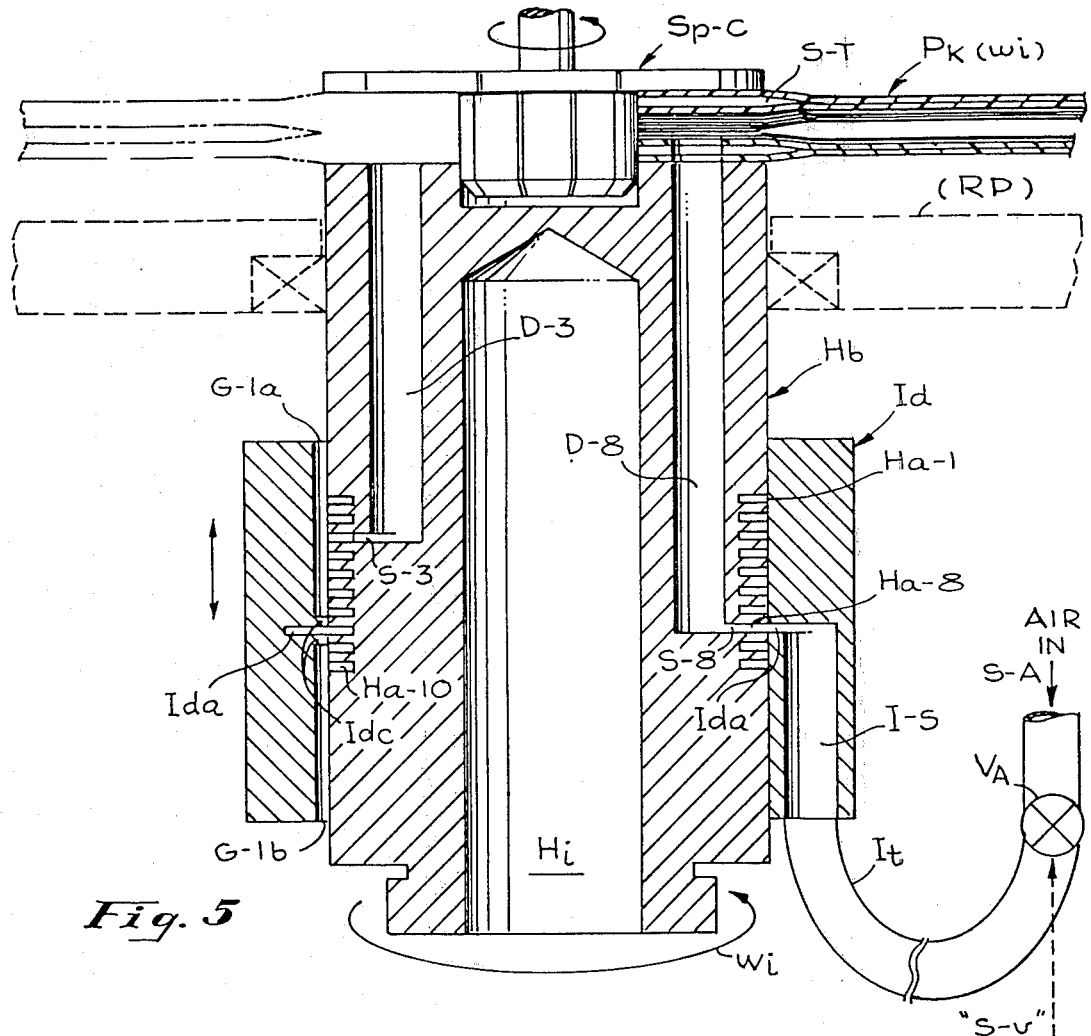
Figure 6:
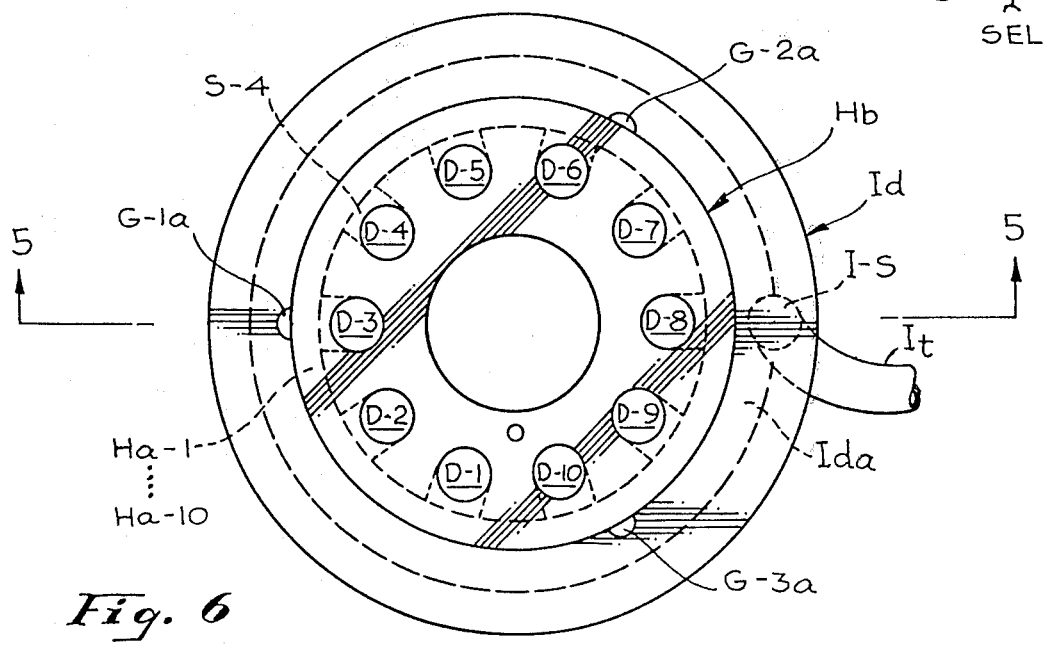
FIG. 6 shows this arrangement in rather schematic plan view.
Figure 11:
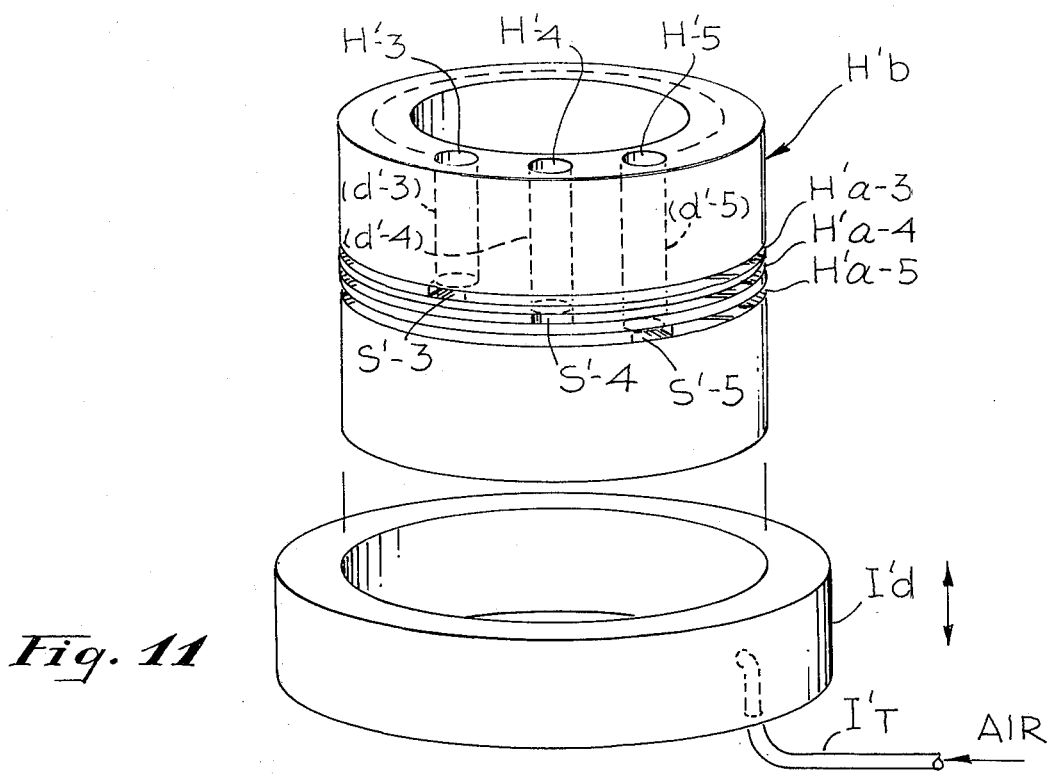
FIG. 11 is a simplified isometric of the array in FIGS. 5 and 6, with the translateable selector sleeve means shown exploded-away.

Turning now to FIG. 9, there is illustrated an alternate array after the manner of the (similarly-illustrated) array in FIGS. 5, 6 and 11. It will be understood as constructed and operated the same except as otherwise specified.

Among other things, this arrangement substitutes an inner select tube Sp-h for the "select-sleeve" $I_d$ in FIG. 5, etc. Also, it modifies the inlets (Ha, S) to ducts D accordingly; i.e., to face inwardly, in communication with tube Sp-h (exit-port S-sl thereof), as illustrated. Tube Sp-h is disposed within the hollow center, H-i' of "Distributor tube" $H_b$, relatively gas-tight relation therewith, at least along periphery of intake ports (semi-annular grooves or slits S-sl). The pressurized partition air is understood as to be selectively supplied up through the hollow center of tube Sp-h (by means not detailed here, but well known in the art).

"Select tube" Sp-h may comprise part of the rotation assembly for rotating outer tube $H_b$ and the rest of the pack assembly (in which case it will be rotationally coupled in gas-tight relation with a supply of pressurized air, as known in the art). Or alternatively tube Sp-h may be kept stationary, as with the array in FIG. 5, tube $H_b$ and the pack being rotated by other means as known in the art.

Of course, the breather slots (grooves G-1 through G-3, in FIGS. 5-7) may be similarly provided along the length of tube Sp-h; however, the upper, innermost portion of the hollow core H-i' of tube $H_b$ must, in such a case, be relieved to provide atmospheric air (venting to feed the upper-slots communicating with the "upper grooves" disposed above a "selected groove" registered with inlet slits S-sl, in the manner of the prior array). Alternate means of providing isolation air (with this or related arrangements) will also occur to those skilled in the art.

Second Selector/Distributor Array
("Cylinder-with-notched Valve Array"; FIG. 10)

Figure 7:
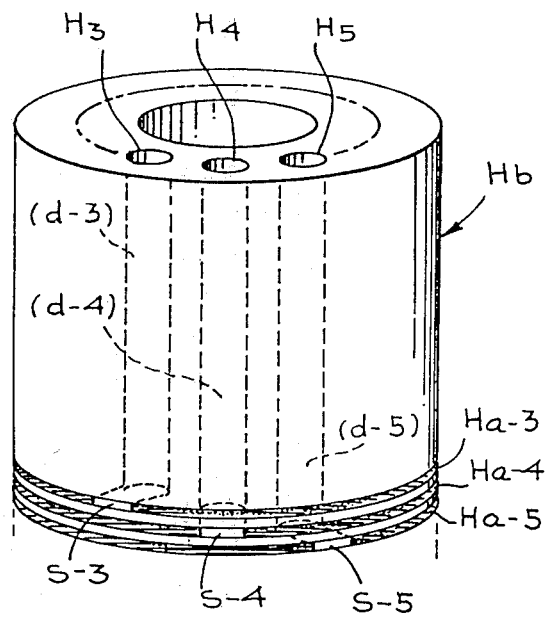
FIG. 7 shows details of the distributor cylinder portion of this arrangement in elevation (partial)

FIG. 10 illustrates yet another modification of the preceding arrangements; one understood as constructed and operated in the same manner as that of FIGS. 5-8 and 11, except as otherwise specified. Here, as a principle modification, the outer "Select sleeve" $I_d$ of FIGS. 5-7 is modified so as to be completely stationary (and not be linearly translated for duct-selection); being provided with an array IA of air supply tubes t, each tube being operatively associated with a respective valve $V_v$ adapted to selectively apply pressurized air thereto from a common source (see manifold S-A'). Each tube t will, in turn, communicate with a respective duct (groove Ha, duct D and associated intermediate port S communicating therebetween).

Thus, FIG. 10 shows a modified inner Distributor cylinder $H'_b$ constructed and operating relatively the same as that of the array of FIGS. 5-7 (except as otherwise described), here being surrounded by a stationary hollow "Select sleeve" $I'_d$. Sleeve $I_d$ may optionally include an array of annular grooves a-1, a-2, etc., each registered with, and in pneumatic relatively gas-tight communication with, a respective one of the grooves Ha on the periphery of cylinder $H'_b$. Fixed sleeve $I'_d$ is connected to fixed intake assembly IA, and neither $I'_d$ nor IA are rotated or linearly translated (e.g., relative to $H'_b$). An array of intake air-conduits (tubes t) are thus connected to sleeve $I'_d$, each communicating with a respective groove Ha (and a, if used). For instance, groove a-1, in pneumatic registry and communication with inner groove Ha-1, is shown pneumatically coupled to associate intake tube t-1, with t-1 connected to the pressurized-air manifold S-A', via an associated valve $V_v$-1. Similarly, grooves Ha-3/a-3 are to be selectively pressurized, through valve $V_v$-3, via tube t-3; grooves Ha-4/a-4 through valve $V_v$-4 via tube t-4, as illustrated in FIG. 10, and so forth.

A gap-select system may be conventionally provided to generate and apply valve-opening signals, S-1 through S-10, to a valve $V_v$ for the pulsed-opening thereof when partitioning is to be initiated at a corresponding gap—e.g., signal S-5 to open valve $V_v$-5, and jet pulse tube t-5, then grooves a-5/Ha-5, duct D-5 via port S-5, to bore-holes H-5, exiting at spacer SD-5, thereby opening a partition gap g5-6, between FD-5, FD-6. However, here isolation-air must be differently provided in such a system. For instance, each of the valves $V_v$ may easily be made to selectively "vent" to ambient air pressure all the time except when "selected" (i.e., except when called upon to pressurize their gap with a partition-air pulse)—according to yet another feature!

Now, by way of illustrating operation of the FIG. 10 array, assume that one wishes to partition at the gap $g_{5-6}$ of spacer SD-5—with a presurized pulse to be sent up duct D-5 through the bore formed by spacer apertures H-5 to exit through SD-5, etc. For this, a prescribed valve-opening signal "s-5" (from Ga-Select control means, not illustrated but implemented as understood in the art) will be understood as applied to open valve $V_r$-5 for a prescribed period. This will send a burst of pressurized air from manifold S-A' down through tube t-5 to be thrust about groove a-5 and over to facing groove Ha-5, so as to enter duct D-5, via inlet port S-5 (in the manner of the arrangement in FIG. 5).

Additionally, and preferably, the exit port for each tube t is adapted to be selectively coupled into relatively air-tight communication with its associated annular groove Ha. Preferably this air-tight coupling is achieved by mounting the cylindrical sleeve $I'_d$ in airtight relation about the periphery of cylinder $H'_b$. Where needed, additional seal means may be conventionally provided. For instance, each tube t may be operatively associated with an annular ring with groove a and made pliable, to be selectively actuated, radially-into, cylinder $H'_b$ during partition—the grooved ring adapted to surround the associated groove a and seal during the period of selection/pressurization.

Workers in the art will reflect upon the merits of such a relatively fixed "Distribution/Select" arrangement, like array IA in FIG. 10—an array which need not be translated axially of the distributor $H'_b$, thus avoiding the attendant prolongation of access time and avoiding problems of misregistration during translation, etc. —yet providing some very distinct and remarkable advantages, as well as greatly simplifying the "SELECT" function.

Importantly, selection and associated pressurization of ducts D may even be made simultaneously with this "fixed" (Distributor and Selector means not moved) array, or they may be otherwise pressurized asynchronous of one another—whereas using a "moving" (Selector-Distributor) arrangement like that of FIGS. 5–7 or that of FIG. 9, etc., only one duct may be pressurized at any one time (serially), and only at relatively widely separated intervals. Workers will thus note that such a modification not only eliminates "Select motion", but also further reduces access time for each partitioning and also makes it possible to partition any number of gaps simultaneously—something strikingly novel!

Preferred Embodiment; FIGS. 12–16

With the foregoing background, workers may better appreciate this invention, especially as represented by the "split spool-in-Distributor cylinder" embodiment of FIGS. 12–16, now described,—this functioning as a "pneumatic commutator" for air jets to the pack. Whereas the above mentioned designs required either relative "selector motion" (between Selector-Distributor; cf. FIGS. 5–7 and 11, where "Selector sleeve" is shifted along Distributor cylinder, or FIG. 9 where "Selector post" is so shifted) or a rather extensive, voluminous array of jet input valves ("valve column", etc. in FIG. 10)—this embodiment requires neither, yet operates at least as well.

As one salient feature, this embodiment involves a "two channel" commutator (split or ridged) spool, accessed by two air streams: low-pressure air (L-air) and high pressure air (H-air). This spool serves to, selectably, direct the H-air to any selected bore (in surrounding cylinder), while sending the "L-air" elsewhere (to all other bores)—and does this with no axial ("select") motion, but only a minor rotational rephasing (of the spool relative to surrounding cylindrical Distributor), with cylinder and spool kept co-rotating with the pack.

Figure 12:
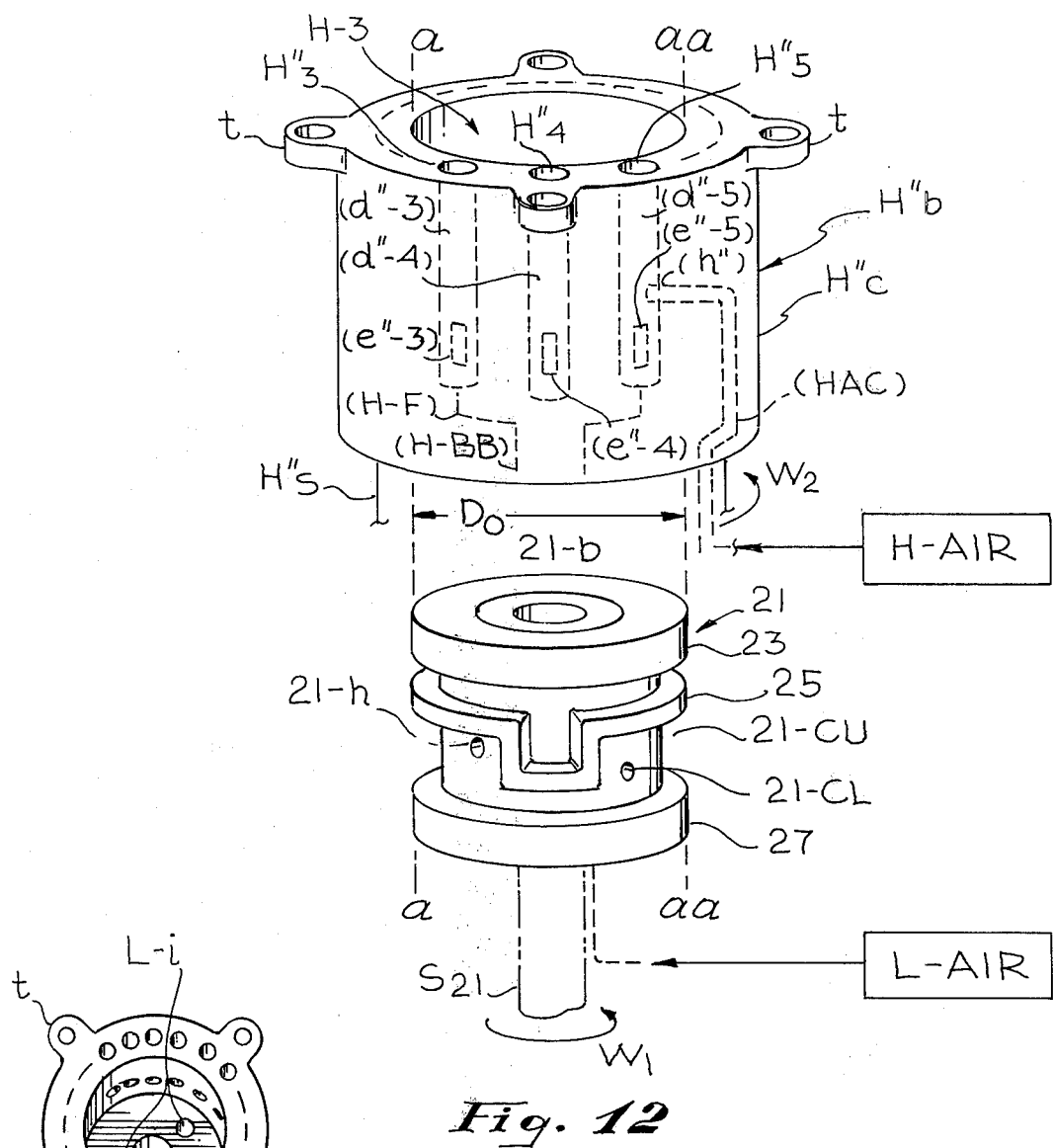
FIG. 12 is a like isometric of yet another type of external pneumatic partitioning means, and one embodiment hereof, with a rotatable U-ridged selector, or "pneumatic commutator", fit within a distributor cylinder modified over that of FIGS. 5, etc., above; with FIG. 13 showing details of this cylinder in upper perspective, and in plan view in FIG. 13-A while details of this "pneumatic commutator" are shown in FIGS. 14 and 15 (perspective and plan view, respectively); and with FIG. 16 showing a somewhat simplified sectional view of the cylinder and commutator together in operating relation.
Figure 13:
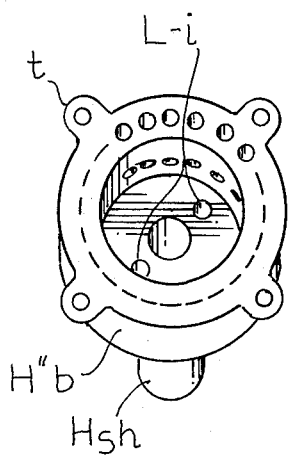
Figure 13:
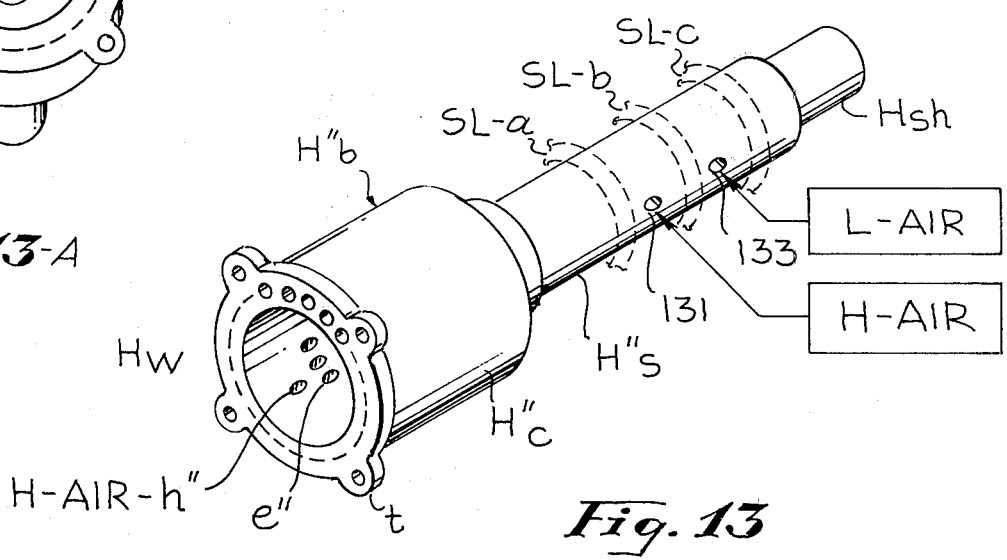
Figures 14, 15, 16:
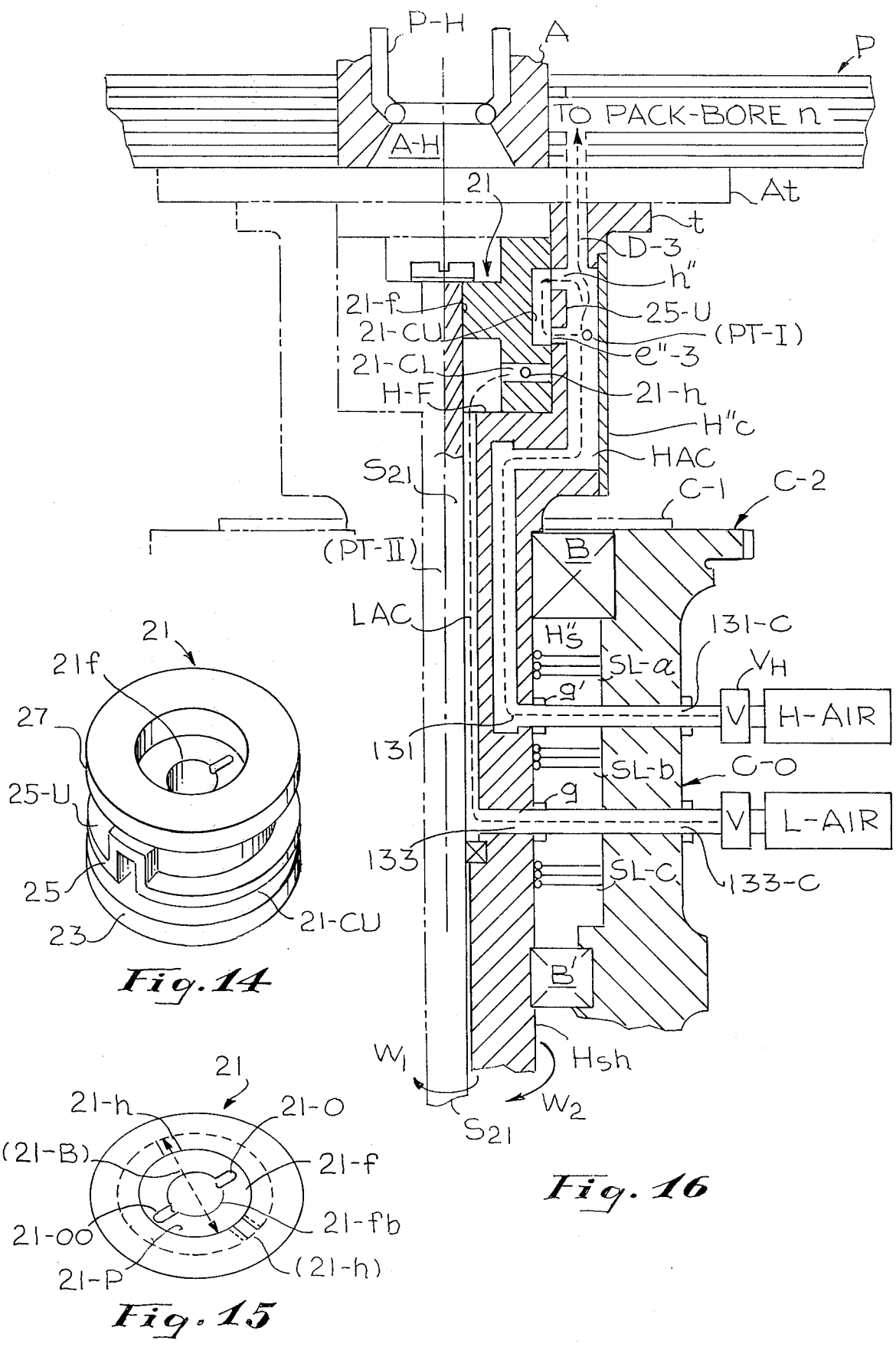

Thus FIGS. 12 and 13 shows according to a feature of this invention a "split spool" 21, exploded away from operating engagement within a Distributor $H_b''$, comprised of a cylinder portion $H_c''$, a shaft $H_s''$ portion and a stem portion $H_{sh}$. Spool 21 will be seen as adapted to be fitted, sealingly, within the hollow center cavity H-B of cylinder $H_c''$ as indicated in FIG. 16 and described more particularly below, (cf. and seated on ledge H-F). Spool 21 will be seen as functionally adapted to receive a pair of different gas streams from respective source input means (such as the functionally indicated H-air input and L-air input in FIG. 16) and direct these streams separately and independently to various different ducts within Distributor cylinder $H_c''$. These ducts $d''$-3, $d''$-4, etc., run axially of the cylinder $H_c''$ and will be seen to be arranged circumferentially so as to register with the pack-bores as in the aforedescribed arrangements (with the cylinder kept rotating synchronously with the pack, to thereby afford air-stream communication between respective ducts and bores as mentioned before).

However, unlike the prior embodiments, the air streams to each respective duct is introduced at a port $e''$ communicating with the hollow bore H-B of the Distributor cylinder $H_c''$. Ports $e''$ are configured to fit within U-segment 25-U (see below) and are arranged circumferentially along a given level so as to be registrable with a prescribed channel portion of the spool 21 (as explained below, registering with the cavity of channel 21-CL between lower ridge 27 and medial ridge 25) this channel being in communication with two L-air holes 21-H through the spool, as indicated in FIG. 12, for instance: FIGS. 12 and 13 indicate this circumferential array or ring of entry ports $e''$.

Additionally, Distributor cylinder $H_c''$ is also modified with an H-air conduction channel, indicated in phantom in FIG. 12 as channel HAC, between outlet port $h''$ and inlet port 131 (these ports better viewed in FIG. 13).

Furthermore, as seen in FIG. 13 for instance, the Distributor $Hb''$ is integrally formed with cylinder $H_c''$ plus a spindle shaft portion $H''_s$ and a stem portion $H_{st}$ projecting therefrom, these being adapted to independently rotate the Distributor cylinder, as well as being formed to introduce the two (H-air, L-air) jet streams as discussed elsewhere.

According to a further and related feature hollow shaft $H''_s$ also includes an inlet channel 133 cut radially through its sidewall and disposed to communicate with a cooperating cavity LAC extending axially up the inner bore of $H''_s$ (otherwise adapted to receive the spool-driving shaft $S_{21}$, see FIG. 16) to terminate adjacent the cavity H-cv receiving the spool 21. Thus, the L-air stream entering at duct 133 may be conducted radially through the spindle $H''_s$ and thereafter axially up the inset channels LAC to exit within the cavity H-cv and within the lower hollow portion of spool 21 being thence conducted radially outward through (two) ports 21-$h$ (see also FIG. 12).

The upper, pack-engaging face of cylinder $H_c''$ is also provided with an array (four shown here) of coupling tabs t including apertures adapted to receive fastening means for removably coupling the Distributor cylinder to a floppy pack, (see also FIG. 13 as well as FIG. 13A, similar to FIG. 13, but showing the Distributor $H_{b''}$ in plan view including the two L-air inlet ports LA-i each communicating with a slot LAC).

Pneumatic Commutator 21

Now, according to one salient feature, the pneumatic commutator or spool 21 will be seen as constructed to provide a pair of upper and lower jet-entraining cavities 21-CU, 21-CL, respectively (these being formed, respectively, between upper ridge 23 and medial ridge 25; and between medial ridge 25 and lower ridge 27 on spool 21 as seen in FIG. 12, for instance).

So, functionally speaking, and according to this feature of novelty, spool 21 is constructed to this entrain two different jet streams each one along one of two respective channels disposed along the outer circumference of the spool 21. Spool 21 is disposed within bore H-B of Distributor cylinder $H_{c''}$ so that one of these channels (see 21-CL) spans the level of duct inlets e'', while the other channel (21-CU) lies somewhat above this level, registering with the level of inlet port h''—see also FIGS. 13 and 16 showing these two adjacent levels.

And, according to a related feature of modified Distributor cylinder $H_{c''}$, one inlet duct system (e.g., see HAC between h'' and 131) is fashioned within the Distributor cylinder, so as to conduct a first jet stream to spool 21, while a second inlet system conducts the other jet stream to the spool. Here, this second system comprises inlet port 133, and (two opposed) slots LAC cut axially along the hollow bore within shaft $H_{s''}$ to communicate with bore H-B and the spool there. Thus, the Distributor cylinder-shaft structure is fashioned to accommodate these inlet slots which conduct the second jet stream (L-air) into communication with the second jet-entraining cavity (21-CL, via holes 21-h in spool 21).

Workers can, of course, contemplate modifications on these inlet duct systems, e.g., the L-air intake embodiment could be replaced by something akin to the H-air duct system HAC, being outletted on the same level as ports e'', or perhaps slightly below these—or conversely H-air could be introduced from above via bore H-B, while L-air might otherwise be introduced through a bore or channel along spindle $S_{21}$ (see FIG. 16, etc., etc.).

Pneumatic commutator, or spool 21 has been functionally described above and will be recognized as generally comprising a regular right cylinder of prescribed diameter $D_o$ adapted to fit snugly into Distributor bore H-B of cylinder $H_{c''}$. Spool 21 includes an inner hollow bore 21-B extending its height except for medial flange 21-f with bore 21-fb adapted to receive a spindle shaft $S_{21}$ and including spline-engaging grooves (FIGS. 14,15) 21-O. Spindle $S_{21}$ is adapted to rotate the spool generally synchronously with Distributor $H_{b''}$ and the subject floppy pack (that is, at angular velocity $w_1$ as known in the art).

As mentioned above, the sides of spool 21 are cut to form a pair of adjacent upper and lower cavities 21-CU, 21-CL, respectively—thus leaving a radial extended upper ridge (flange) 23, medial flange 25 and lower flange 27—all registering with the prescribed outer diameter $D_o$, between locii a and aa. As mentioned before, lower cavity 21-CL communicates, via an opposed pair of inlet ports 21-h (FIGS. 12 and 16, extending radially through the walls of spool 21) with spool inner cavity 21-b—and, thereby, with the L-air duct system LAC as mentioned above. The height of the channel 21-CL will generally be understood as sufficient to span the height of duct inlets e'' when spool 21 is registered axially therewith (i.e. when held on seat H-F, with spindle $S_{21}$ fastened). Similarly, the height of adjacent, upper channel 21-CU (both cavities extend circumferentially about spool 21) will be such as to span the height of the associated outlet port h'' with which it is to be in pneumatic communication (when spool 21 is properly seated within cavity H-B, as in FIG. 16).

According to a salient feature of novelty the medial flange 25 is formed to be offset axially in a U-shaped "loop" 25-U, serving to extend upper cavity 21-CU axially across all, or a prescribed portion of) lower cavity 21-CL and being of sufficient width to be selectively registered with any one of inlet ports e''. Such registration is effected, selectably, according to the rotational phase of spool 21 relative to Hb'', as adjusted by control of shaft S-21 as is well known in the art. Thus, U-shaped loop 25-U is sufficiently wide to span the width of port e'' and is sufficiently high (axially) to intercept that portion of cavity 21-CL which is registered with the level of ports e''.

Thus, functionally speaking, workers will understand that, with spool 21 properly seated in bore H-B, (as in FIG. 16) upper cavity 21-CU will be registered with the level of port h'' and in pneumatic communication therewith, while lower cavity 21-CL will be in similar registration with the level of ports e''—with loop 25-U *also* being registered with a selected one of outlet ports e'', according to the rotational phase of spool 21 relative to Distributor Hb''.

And so, with a first jet stream (H-air) being supplied as described above to fill channel 21-CU, this H-air stream will be selectively directed into a Distributor duct (e.g., d''-3 communicating with the port e''-3, for example) with which loop 25-U happens to be registered. All other ports e'' will be in registry with the level of lower cavity 21-CL and will thus be in communication with the other jet stream L-air—hence this other stream will be supplied to all the other ducts d''.

As a consequence, in such a situation, the inter-disk gap communicating with duct d''-3 will be supplied with H-air and caused to open, partitioningly (at least partly), while all the other gaps, being thus in communication with the stream of L-air, will be opened only slightly or else closed down (somewhat depending upon the air-pressure and control desired). Workers will appreciate the great advantage of so simply and conveniently supplying two different air streams to all the inter-disk gaps in various combinations—simply by the use of such a split-spool within a modified Distributor cylinder, and with selection so simply derived—namely by simply rotating the spool and Distributor synchronous with the pack and phasing the spool rotationally to register its U-segment 25-U with the desired port for the selected gap.

FIG. 14 also indicates split spool 21 in lower perspective (upside down from the position in FIG. 12) while FIG. 15 shows the spool in plan view. Here it will be seen that the cavity 21-B of the spool is interrupted by flange 21-f, and communicates with a smaller bore 21-fb in flange 21-f for receiving the spindle shaft $S_{21}$. The opposed radial cuts 21-O are adapted to receive a spline on shaft $S_{21}$ or the shaft head, adapted to key the rotating spindle to spool 21 as known in the art. Here, ports e will be understood as disposed and configured to be registrable within the confines of U-loop 25-U.

Spool-Distributor Combination; Operation; FIG. 16

FIG. 16 is an enlarged schematic sectional view of the spool 21 assembled in place within the Distributor cylinder $H''_c$, with related members schematically shown in operative combination therewith—such as an illustrative floppy disk pack P attached thereto and positioned in rotatable relation with fixed housing structure C-O, etc., plus a pair of air supply means H-air, L-air. Thus, spool 21 is attached to the top of its shaft $S_{21}$ via an insertable head bolt and associated splines (in 21-O) as known in the art. Shaft $S_{21}$ is adapted to rotate spool 21 at a prescribed angular velocity $w_1$, independently of the rotational velocity $w_2$ of cylinder $H''_c$.

Now, a coupling plate $A_t$ including a hub portion A-H, will be seen as illustratively coupled, via bolts through tab portions t, to Distributor cylinder $H''_c$. Floppy pack file P including a stack of floppy disks will be understood as provided with spacers and the appropriate partition bores as mentioned before along with conventional pack coupling means P-H, adapted to be superposed over hub A-H and clamped thereto as known in the art. Coupling plate $A_t$ thus couples the Distributor $H''_b$ to the pack P to co-rotate both together. As mentiond before, this will couple each of the ducts d'' in cylinder $H''_c$ with a respective one of the bores in pack P so that each bore-duct system communicates with a different inter-disk gap.

The lower shaft portion $H_{sh}$ of the Distributor $H''_b$ is mounted to be independently rotated at a prescribed associated angular velocity $w_2$, and so rotate cylinder $H''_c$ and pack P. Shaft $H_{sh}$ is rotatably mounted and received in a fixed support housing C-O, with appropriate bearing and sealing means (seal means about the air ducts to isolate them pneumatically from one another and from ambient), the shaft being hollow, of course, to accommodate spool-spindle $S_{21}$, journaled therein as known in the art. As an example, housing C-O may include a pair of (annular) alignment bearings B, B' support $H_s$, $H_{sh}$ for free rotation of the cylinder-shaft combination. The housing also includes a pair of air conduits 131-C, 133-C, each coupling an air supply (H-air, L-air, respectively) to respective circumferential grooves g, g' and associated respective inlet ports 131, 133 in shaft $H_{sh}$.

According to another related feature, magnetic seals SL are provided about each said duct to pneumatically isolate it (from the other duct and from ambient). Thus, a pair of annular rotating magnetic seals SL-a, SL-b are fixed to respective portions of housing C-O being disposed about (H-air) duct 131-C and arranged as known in the art to accommodate the relative rotation of the Distributor shaft $H_{sh}$ while being kept in relative air tight isolation. That is magnetic fluid means accommodates this relative rotation while preventing any air leak as known in the art. Seal SL-b is further arranged with companion seal SL-c to surround the other air duct 133-C and isolate its L-air stream from the outside and from the H-air. Workers will recognize that such pneumatic isolation is quite important and yet is problematical to provide. But using an arrangement like that of the invention with the air supply entrained through the Distributor cylinder body to a split spool of the type described makes this possible when combined with such magnetic fluid sealing means according to this feature.

Operation of this device should be evident from the foregoing, but will be re-summarized, exemplarily, as follows. It will be understood that the Distributor array $H''_b$ (i.e., cylinder $H_c''$ and shafts $H_s''$, $H_{sh}$) is coupled, as mentioned, to a test floppy disk pack, with each of its ducts d'' registered with a different respective pack bore and the shaft $H_{sh}$ spun up to a prescribed angular velocity $w_2$ consistant with favorable operation of the floppy pack. And, with spool 21 disposed within the bore H-B, resting on flange H-F and connected to be rotated by shaft $S_{21}$, the spool 21 is spun-up to an angular velocity $w_1$ exactly equal to pack velocity $w_2$ (of the coupled pack and Distributor).

At this point, it is, determined that a particular disk partition is to be made between disks $d_2$ and $d_3$ for example. This means that high pressure air (H-air) must be directed through Distributor duct d''-3 to the associated pack bore, while low pressure air (L-air) is directed to all the other ducts d'' and associated inter-disk gaps. Accordingly, the rotation of spool shaft $S_{21}$ is modulated to phase spool 21 and rotate it relative to Distributor $H''_b$, so that the U-shaped portion 25-U of spool 21 is registered with inlet e''-3 of the Distributor, communicating with selected duct d''-3 and coupling it to the H-air supply.

At this point, the valves ($V_H$, $V_L$) for the (H-air and L-air) air supplies are opened to input the respective air streams through the Distributor body and to respective (upper and lower) cavities 21-CU, 21-CL of the split spool 21, whence they will be "steered" into Distributor ducts and pack bores as discussed before. Thus, the Distributor means will be seen to direct (two) air streams to the split-spool, and also conduct them from it to certain pack bores—a novel feature workers will appreciate! More particularly, the low pressure air stream will enter from valve $V_L$ through housing duct 133-C into the Distributor at inlet port 133 and up (one of the pair of) channels (LAC), along the inner bore of the Distributor, to emerge adjacent flange H-F seating spool 21 and the hollow spool cavity whereupon the air will exit through orifices 21-h to fill outer spool cavity 21-CL. From there, the L-air may be conducted through ports e'' into all the ducts d'' of the Distributor cylinder $H''_c$ except for duct d''-3 which as mentioned is registered with the upper cavity 21-CU via ridge-loop 25-U. (The two cavities 21-CU, 21-CL are, of course, pneumatically isolated from one another and from ambient). This L-air path is indicated in phantom as path PT-II in FIG. 16.

In similar fashion, the high pressure air is introduced by the opening of associated valve $V_H$ introducing the air through housing duct 131-C into Distributor inlet port 131 to proceed up through the Distributor along the associated high pressure inlet passage HAC to exit at port h'' and be presented to fill upper spool cavity 21-CU including loop 25-U—this H-air path being represented by the dotted line PT-I.

Proceeding to loop segment 25-U, this high pressure air is driven through port e''-3 and up associated duct d''-3 and its registered bore to pressurize the mentioned selected intra-disk gap and initiate partitioning there pneumatically.

Figure 17:
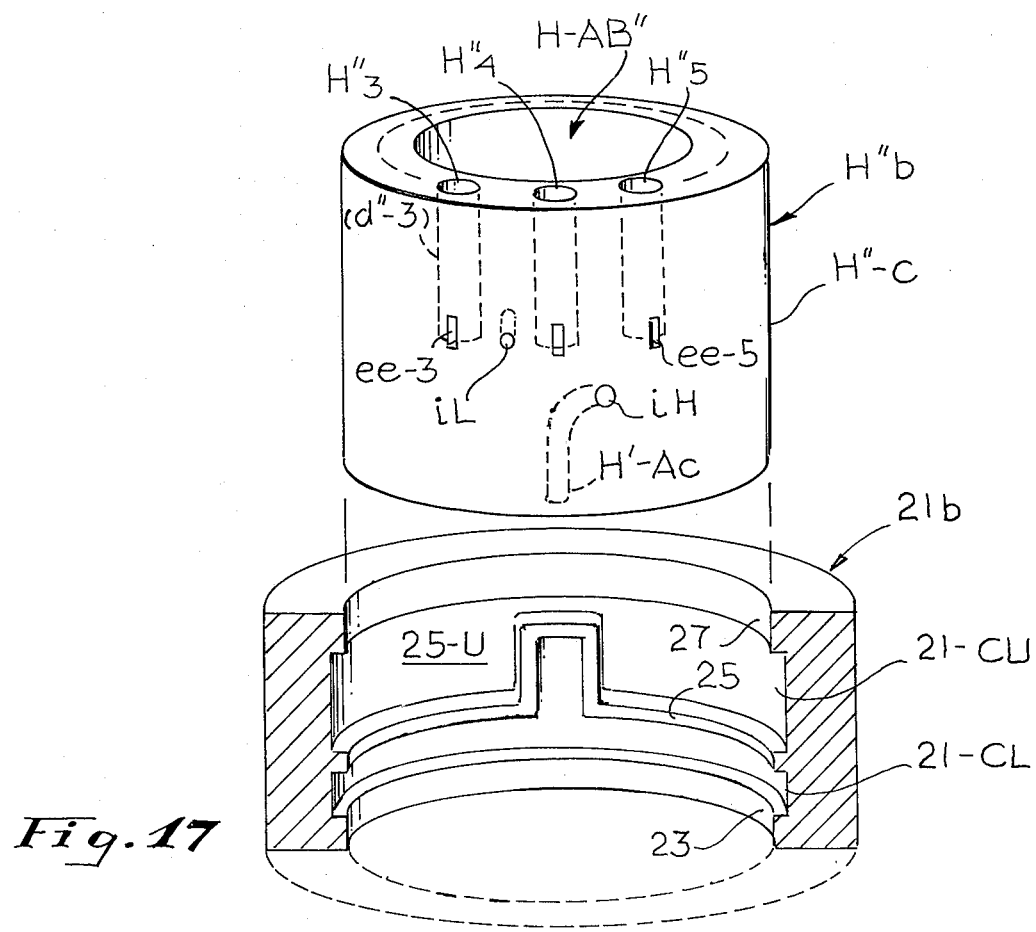
FIG. 17 shows, in schematic elevation, a second embodiment hereof and a modification of that in FIGS. 12–16, with the "commutator" exploded away.

Alternate Embodiments; "Distributor Cylinder-in-Split Spool"; FIG. 17

FIG. 17 indicates a modification of the invention as shown in FIGS. 12–16 with the split spool inverted and modified so that it surrounds the Distributor cylinder—and related modifications in the cylinder and associated operations are provided, this embodiment being characterized as a "Distributor-in-split spool".

Such a spool is represented in FIG. 17 as a hollow annulus $21_b$ with a center bore adapted to surround associated Distributor cylinder $H''_{bb}$ in slidable air tight relation as before. The inner hollow center of spool $21_b$ is cut to form a pair of circumferential cavities 21-CU, 21-CL (upper and lower, respectively) these being defined by ridge portions; namely, upper ridge 23 and medial ridge 25 (defining cavity 21-CU) and lower ridge 7 (lower cavity 21-CL). As before, medial ridge 25 includes a U-shaped loop segment 25-U extending sufficiently across the height (i.e., axially) of upper cavity 21-CU to be registrable in pneumatic communication, with one of the Distributor ports ee disposed along the level spanned by cavity 21-CU as before.

Spool $21_b$ is shown exploded away from cylinder $H''_{bb}$; normally it will be disposed in surrounding, air tight relation with $H''_{bb}$, with upper cavity 21-CU intercepting the level of ports ee and lower cavity 21-CL similarly registrable with a respective high pressure outlet i-H on an adjacent level. Here, again Distributor cylinder $H''_{bb}$ will be coupled drivingly with the disk pack array and include a rotating spindle portion (none of these shown but understood by those skilled in the art, especially in light of the foregoing embodiment). Distributor $H''_{bb}$ will also include associated high pressure and low pressure inlet means, plus conduit arrangements as described below.

Spool $21_b$ will be understood as seated rotatably on a respective casing-bearing structure and will include, or be attached to, an associated independent drive spindle as before (none of these means are shown, but they will be understood by workers skilled in the art). High pressure air will be introduced (by means not shown) and entrained along an associated duct H'-AC to emerge at exit port i-H along the periphery of cylinder $H''_{bb}$ at a level adjacent to that of ports ee, and just below (using the same arrangement as indicated for the embodiments of FIG. 12–16, or a different related one as workers in the art will contemplate).

It will be understood that this embodiment is like the previous one except as specified. For instance, Distributor $H''_{bb}$ has 20 ducts d" each communicating with one of 20 bores through a pack (not shown) clamped thereon. Ports ee comprise relatively rectangular slits adapted to fit within the confines of the U-shaped segment 25-U.

According to a modified feature, the other (low pressure) air supply will be introduced from within cylinder $H''_{bb}$ (by means not shown but well understood in the art—e.g., introduced through bore HAB") to emerge at an exit port i-L disposed along the level of duct inlets ee and in common pneumatic communication with associated cavity 21-CU of spool $21_b$. Thus, in this instance (unlike the prior embodiment) both air streams will be introduced to the respective spool cavities directly from passages in the body of the Distributor cylinder, exiting directly from the cylinder to the respective spool cavity.

Workers will recognize that this embodiment is, in some features, a mere variation on the arrangements and novel functions of the prior embodiment (FIGS. 12–16), with the split spool being disposed outside (rather than inside) the Distributor cylinder and with the output connections (ports ee) and input connections to the spool (input ducts terminating at port i-L and i-H, respectively) rearranged accordingly. There is the additional difference, however, that the low pressure air is introduced completely through the Distributor body rather than being routed (at least in part) through the body of the spool as in FIGS. 12–16, etc. Now, as a variation, workers will understand that one or both of the air supplies could be otherwise introduced; i.e., not through the Distributor cylinder $H''_{bb}$, but from outside the spool $21_b$, e.g., via a stationary outer cylinder surrounding cylinder $21_b$ and adapted to feed a pair of through-ports from the outside of $21_b$.

Workers will contemplate other variations using the "split spool" feature and some sort of associated Distributor structure.

Figure 18:
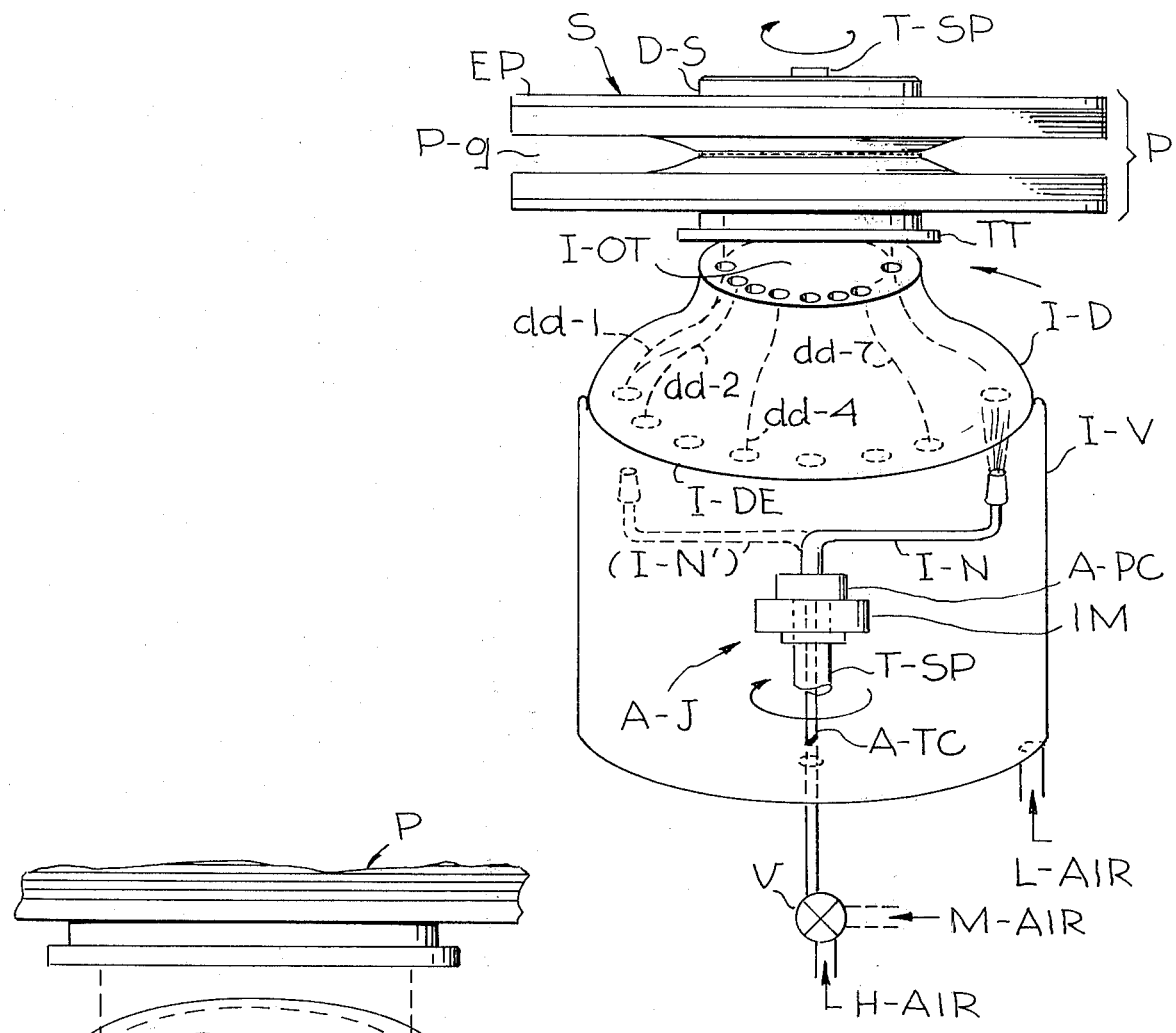
FIG. 18 shows another embodiment, best understood as a modification of the arrangement depicted in FIG. 1.

Further Embodiment; FIG. 18

FIG. 18 shows an embodiment similar to that of FIG. 1 at least functionally, except that it provides a bore extending distributor means I-D and a closure I-v, along with one or several rotating nozzle-select means I-N, I-N', etc. The vessel or enclosure I-v surrounds select means I-N, etc. and is adapted to direct and entrain a second supplemental air stream (L-air) to drive a column of low-pressure air upward against the bottom of Distributor I-D so as to fill all the "non-selected" ducts dd and the associated inter-disk gaps (i.e., except where nozzles I-N, etc., are projecting their air stream).

The illustration in FIG. 18 is primarily propaedeutic and illustrative, and is not to be confused with a final embodiment, but only indicative of another approach similar to the foregoing embodiments. Thus, Distributor means I-D is mounted (by means not shown but well understood in the art) to present an array of ducts dd-1, dd-2, etc., extending between respective input ports on a first face I-DT and exit ports on a distal bottom face I-DE. As before, the input ports on face I-DT correspond, in placement and dimension, to the bores aforedescribed in pack P. Distributor I-D is arranged so that, once these input ports are registered with pack bores, the structure I-D is rotated synchronously with pack P as before. A high pressure air select array A-J, comparable to that in FIG. 1, will be understood as arranged to cooperate with (one or several) controllably-rotated jet nozzle means I-N adapted to rotate in synchronism with the exit face of I-DE of Distributor I-D as desired. In this way the high pressure air stream emanating from a given nozzle I-N will be kept registered with a selected duct dd. When a different duct is to be so selected, one need only to rephase nozzle rotation and register its jet stream with the new duct dd as workers will appreciate. As indicated in phantom at companion nozzle I-N', one or more supplemental nozzles may also be rotated in common with primary nozzle I-N, or be differentially phased rotationally with respect thereto as workers in the art will appreciate (means not shown but well understood in the art).

It will be apparent to those skilled in the art that this Distributor I-D, like the others aforementioned, serves to extend the path and direction of the pack bores to a remote entry site—here face I-DE located at virtually any selected distance and direction from the pack P. Also, the input ports (on face I-DE) can thus be arrayed in virtually any pattern convenient for introduction (of one or several) air streams. This concept is further expanded-upon in FIG. 19 described below.

As another enhancement of the arrangement in FIG. 1, Distributor I-D and nozzles N, with their drive means, etc., are enclosed in air-tight fashion in stationary vessel I-v into which another, diffently-pressured (or evacuated) air stream, L-air, is introduced. As mentioned, vessel I-v can present L-air stream to all the other ducts dd which are "non-selected" and which are not impacted by the high pressure jet streams from nozzles I-N, etc. These "non-selected" ducts can thereby receive an associated differently pressured gas stream. Here, as in FIG. 1, certain details are not illustrated or described and will be understood. Workers will contemplate other variations on this FIG. 18 embodiment.

Figure 19:
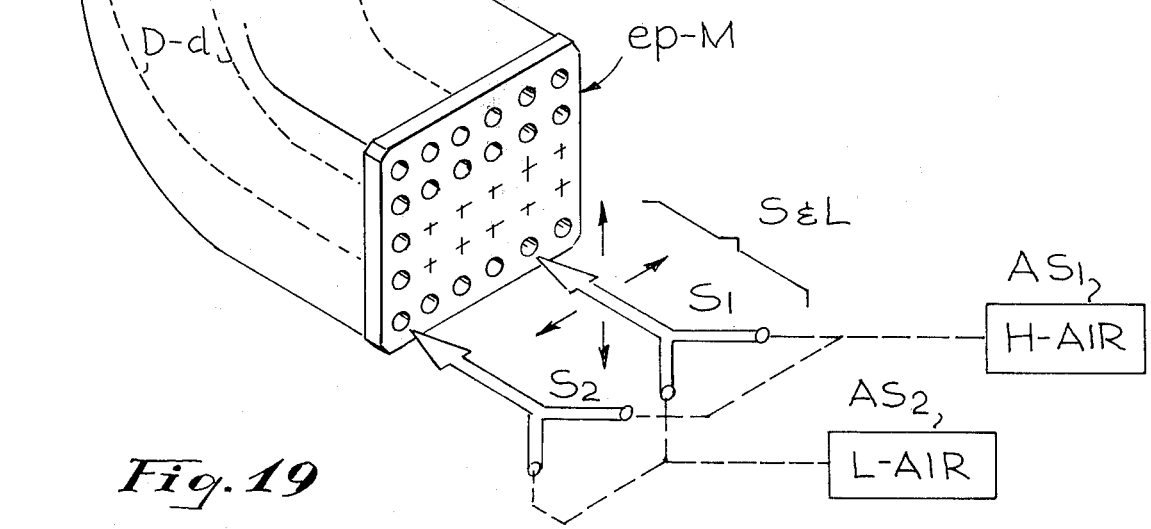
FIG. 19 shows a generic Distributor-Selector arrangement.

Generic Illustration; FIG. 19

FIG. 19 represents a very schematic idealized representation of a generic class of air selection/distribution means of the type above described and is offered in conjunction with the following discussion of certain general functional aspects of such embodiments.

It will be understood that this schematic arrangement comprises a Distributor means D-M including ducts D-d (dotted lines) extending between an input face In-M and an output face ep-M whereon are located an array of prescribed entry and exit ports, respectively, in the manner of the embodiment of FIG. 18 and others above described. The entry ports on input face In-M will be recognized as configured and disposed to register with the bores through the disks and associated spacers in pack P as before. The exit ports on the output face ep-M will be understood as arrayed at virtually any direction and distance from the input face and in virtually any configuration desired (e.g., that the size of the overall array and their relative order, ect., may be completely changed as indicated in FIG. 19). Additionally, an array of one or more select means SEL is arranged to scan, or be scanned by, the array of entry sites presented by face ep-M. Thus for instance, one or several, air stream projecting nozzles S-1, S-2, etc., are here arrayed to, each, receive one or several differently pressured (or differently evacuated) air streams, such as from high pressure air source $AS_1$ and from low pressure source air $AS_2$. Each nozzle may be arranged to scan the array of entry ports on face ep-M, or to be registered with one of these ports and kept moving to maintain this registration with the port, when the entire Distributor D-M rotates (as it preferably does to keep ducts D-d registered with pack bores).

Conclusion

The features and results achievable with arrangements like the described embodiments will be gratifying to workers in the art; for instance, the desirable "endwise", "hub-oriented" pneumatic "extra-pack" partitioning—something here achieved with only a few conventional elements; e.g., involving the delivery of partition-air to selected bores simply by manipulating a pneumatic select-spool in conjunction with a "ducted-cylinder" Distributor means.

Other Embodiments

While some described embodiments have preferably involved a removable cartridge (from of floppy disk pack), workers will understand that the instant invention may be used with other analogous arrangements that present a rotating array of "bores", such as a fixed array of floppy disks stacked fixed along a prescribed (horizontal or vertical) axis and susceptable of pneumatic, "end-wise" partitioning. Also, in some cases related rigid disks, or other like configurations may be similarly partitioned and similarly manipulated pneumatically.

Workers in the art will recognize many features of advantage and surprising novel utility deriving from devices designed and constructed along the described lines. They will recognize that, using such designs, pack structure may also be modified to accommodate such pneumatic manipulation—the associated jet delivery/selector means being simple to manufacture and convenient to use.

A variety of packs will be seen adapted for advantageous interaction with external pneumatic partition aeration means of the type described, wherein the natural centrifugal pumping action of the pack under high speed rotation assists in establishing a stable air film to separate disks, while also assisting in pneumatic partitioning. A versatile, fast, simple partition control is facilitated (e.g., with a simple, quick rotational in indexing of a cylinder); this will be appreciated, especially since it affords a wholly pneumatic partitioning, with no intrusion of mechanical elements into the pack, (e.g., none translated within the pack's hollow hub-chamber). The flexible disk packs and associated manipulation means contemplated herein will be understood by workers in the art to have special utility for certain "high performance" (high rpm), out-of-contact recording applications.

Figure 20:
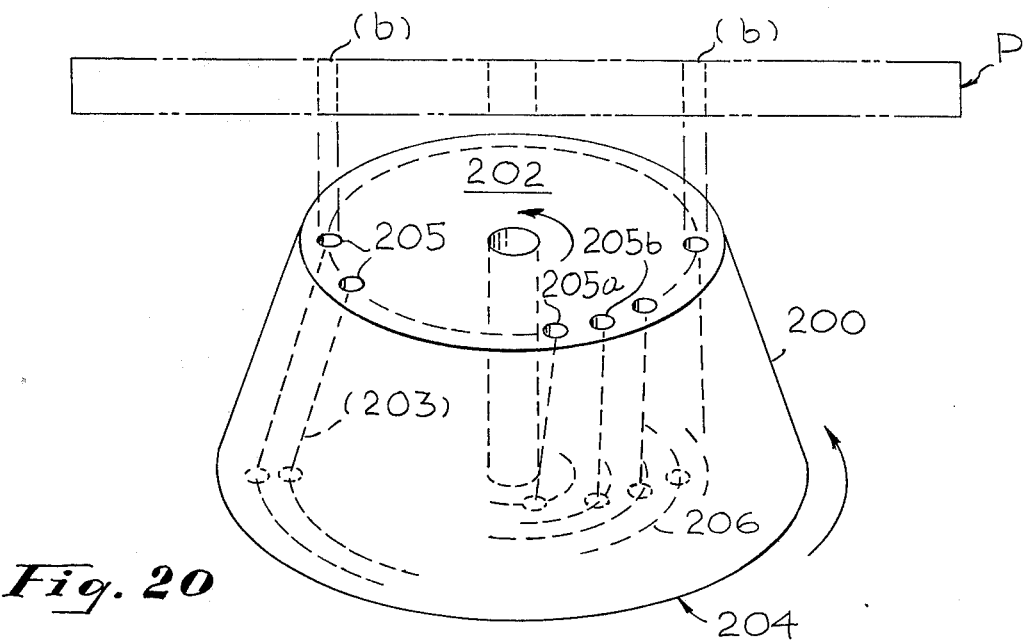
FIG. 20 is a showing, along the lines of FIG. 11, of a modified Distributor means, this means inverted in FIG. 21.
Figure 21:
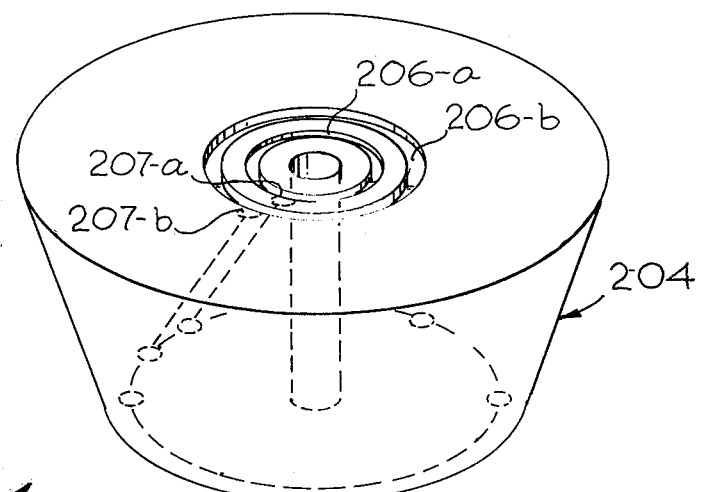

For example, FIG. 20 represents another Distributor means,—one functionally similar to Distributor cylinder $H'_b$ in FIG. 11, but modified to present air intake slots arranged across a planar face rather than about a cylinder. More particularly, here frustro-conical Distributor 200 (see FIG. 20A, shown inverted in FIG. 20B) includes an array of axially-directed conduits 203 extending—along virtually any route—between respective outlet ports 205 on a first face 202 and in-ports 207 on a second face 204, opposite face 202, (e.g., conduit 203-a connects inlet 207-a to outlet 205a). Except as otherwise specified, it will be understood that this embodiment is structurally and functionally the same as that of FIG. 11, etc. Thus, it will be understood that a floppy pack P is to be coupled adjacent face 202 of Distributor 200 and rotated in synchronism therewith so that respective pack bores b are kept registered (for pneumatic continuity) with out-ports 205.

Now, as a novel feature hereof, inlet ports 207 each communicate with a respective circumferential slot 206 so as to allow an air stream injected into a certain slot 206 (e.g., by Select means not shown here but understood in the art) to be routed down the associated inlet 207, duct 203, outlet 205 and bore b to effect a desired pneumatic manipulation of the inter-disk gap communicating with this bore, (e.g., this Select means preferably includes planar "cover means" overlying concentric slots 206 to confine an air stream in any given slot, isolating it from other slots and ambient; such means being understood, not illustrated here).

Such an embodiment will illustrate the fact that Distributor means (and associated Select means) of the type indicated (e.g., in FIG. 11, etc.) may readily be modified structurally, while yet retaining their novel functional features here described.

It will be understood that the preferred embodiments described herein are only exemplary, and that the invention is capable of many modifications and variations in construction, arrangement and use without departing from the spirit of the concepts taught. As an example of further modifications, the means and methods disclosed herein may, in certain cases, also be applicable with certain other pneumatic systems and the like, as well as being applicable in conjunction with other supplementary partition means.

All variations of the invention being merely illustrative, the invention should be considered as including all possible modifications and variations coming within the scope of the invention as defined by the appended claims.

What is claimed is:

1. An improved pneumatic directing arrangement adapted to direct at least one gas stream through a flexible disk pack, end-wise and axially, this pack being characterized by an array of bores extending axially through the pack cross-section, the bores terminating at a respective interdisk gap for conducting the gas stream thereto; this arrangement comprising, in combination therewith;

bore-Select means disposed externally of said pack and adapted to receive at least one gas stream and to controllably project the stream toward a prescribed intake locus, disposed remote from said pack at virtually any distance and direction therefrom; and pneumatic Distributor means arranged in operative relation about this Select means, serving to extend said bores to said locus and adapted to couple a gas stream from said Select means to any selected one of the bores and associated inter-disk gaps;

said Distributor means comprising a hollow cylinder, and said Select means comprising a dual channel rotor disposed co-axially with said Distributor means and adapted to direct a pair of gas streams to respective bore-extending ducts in the Distributor means, selectably according to the rotational position of the rotor relative to the Distributor means.

2. An "end-wise aerated" disk drive comprising:

a plurality of flexible recording disks and intermediate spacer means, all apertured and stacked so as to generate an array of axial bores, these communicating with respective inter-disk gaps;

axially offset pneumatic director means adapted to manipulate the pack and selected disks therein by selectively directing pneumatic streams of pressurized air or a vacuum through selected ones of said bores;

said director means being disposed outside the confines of the pack and characterized by ducted sleeve Distributor means and by associated rotor-select means adapted to direct such pneumatic streams into selected ducts and associated communicating bores; said Distributor means being adapted to be co-rotated with the pack, while said select means comprises a split-channel rotor kept rotating with the Distributor means, being rotationally phased relative thereto to effect duct selection.

3. In an improved arrangement for pneumatic manipulation of a pack of floppy disks, this pack including conduit means for directing a partitioning air stream over pressurized or under-pressurized, axially through the pack to introduce the stream between selected disks; this arrangement comprising:

external pneumatic director means disposed outside the confines of said pack and displaced axially therefrom the director means comprising a sleeve and rotor combination disposed to be pneumatically coupled with said conduit means adapted to couple the air stream to said conduit means at a remote site so as to pressurize or evacuate the air between prescribed selected disks; said director means comprising:

a cylindrical Distributor sleeve body disposed adjacent said conduit means and incorporating pneumatic conductor means therethrough which includes an array of elongate passages directed through said body so as to extend in pneumatic communication between this site and the conduit means of said pack, being adapted to conduct said stream, each passage being adapted and aligned to register with a respective bore portion of said conduit means; and also comprising;

stream rotor injection means comprised of a multi-channel rotor adapted to rotate co-axial synchronously with the pack and the Distributor body, while being rotationally phased with respect thereto to effect passage selection and associated disk pressurization or evacuation, the injection means being disposed operatively adjacent said body and adapted to direct the air streams into a selected one of said passages in the body according to the desired pressurization or evacuation between selected disks.

4. In an improved arrangement for end-wise pneumatic manipulation of a pack of floppy disks, this pack including conduit means for conduction of pneumatic forces axially, up through the pack, to introduce prescribed pressure or vacuum between selected adjacent disks; the arrangement comprising:

cylindrical pneumatic director means arranged and adapted to be pneumatically coupled to said conduit means and to selectively present pneumatic streams representing said forces into at least a portion of said conduit means so as to introduce said pressure or vacuum between any selected adjacent pairs of said disks; this director means comprising a Distributor cylinder body and associated rotationally-selectable rotor Select means; the body comprising a ducted cylinder sleeve and presenting an array of ducts extending between said conduit means and a selected entry site remote from the pack; the Select means comprising a split-channel rotor disposed co-axial therewith, while arranged operatively adjacent this body and adapted to couple at least one pneumatic vacuum or pressure stream to selected ones of said ducts.

5. The combination as recited in claim 4, wherein each Distributor body terminates, externally, in a respective entry port means and wherein said select means effects duct selection for a given stream by controlled translation to the associated entry port means.

6. The combination as recited in claim 4, wherein the rotor is disposed within the center bore of the cylinder sleeve and adapted to present a plurality of circumferential stream-conducting channels, one for each said stream; and wherein the ducts in said body are arranged to exit in the cylinder bore at a level corresponding to a selected one of said rotor channels.

7. The combination as recited in claim 6, wherein the rotor comprises two channels, a first one of which includes a loop portion intersecting the adjacent second channel; wherein the cylinder includes duct-entry-ports dimensioned and disposed to be pneumatically coupled with said second channel and, selective, with said loop portion, individually.

8. An improved method of partitioning a flexible disk pack which includes an array of bores extending axially, end-wise of the pack, each communicating with a respective inter-disk gap, this method comprising the steps of:

arranging Distributor conduit means adjacent one end of the pack to co-rotate therewith, this conduit means including an array of conduits, each in registry with a respective one of said bores and extending axially away from the pack for a selected distance and direction to a respective entry-site;

providing an associated multi-channel rotary Select means adapted to selectively present at least two pneumatic streams, of partial vacuum, pressurized air at any selected entry-site;

automatically selecting the site corresponding to a given bore and gap in pneumatic communication therewith by operating and rotating said rotary select means to present the stream to the corresponding conduit.

* * * * *